(12) United States Patent
Chen

(10) Patent No.: US 11,169,377 B1
(45) Date of Patent: Nov. 9, 2021

(54) MULTI-FOCAL PLANE HEAD-UP DISPLAY

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 0 days.

(21) Appl. No.: 16/948,383

(22) Filed: Sep. 16, 2020

(51) Int. Cl.
*G02B 27/01* (2006.01)
*G02B 27/00* (2006.01)

(52) U.S. Cl.
CPC ..... *G02B 27/0101* (2013.01); *G02B 27/0093* (2013.01); *G02B 2027/0196* (2013.01)

(58) Field of Classification Search
CPC ............ G02B 27/0101; G02B 27/0093; G02B 2027/0196
See application file for complete search history.

(56) References Cited

U.S. PATENT DOCUMENTS

| | | | | |
|---|---|---|---|---|
| 7,733,572 | B1* | 6/2010 | Brown | G02B 27/148 359/631 |
| 9,188,779 | B2* | 11/2015 | Sakai | G02B 27/01 |
| 9,459,452 | B2* | 10/2016 | Hada | G03B 21/2033 |
| 10,018,840 | B2* | 7/2018 | Kim | G02B 5/30 |
| 10,234,683 | B2* | 3/2019 | Okayama | G02B 17/023 |
| 10,409,061 | B2* | 9/2019 | Matsuura | G02B 27/0101 |
| 10,859,826 | B2* | 12/2020 | Hayakawa | G02B 27/0172 |
| 2009/0009594 | A1* | 1/2009 | Kawai | H04N 13/302 348/54 |
| 2009/0040138 | A1* | 2/2009 | Takahashi | H04N 13/365 345/32 |
| 2010/0315577 | A1* | 12/2010 | Li | G02B 27/0018 349/96 |
| 2011/0175798 | A1* | 7/2011 | Sato | B60K 35/00 345/7 |
| 2013/0242404 | A1* | 9/2013 | Kobayashi | G02B 27/01 359/630 |
| 2014/0036374 | A1* | 2/2014 | Lescure | G02B 27/0101 359/630 |
| 2015/0355461 | A1* | 12/2015 | Kessler | G02B 27/0081 359/631 |
| 2016/0202479 | A1* | 7/2016 | Okayama | G02B 27/0101 359/633 |
| 2016/0216521 | A1* | 7/2016 | Yachida | G02B 27/0179 |
| 2017/0045738 | A1* | 2/2017 | Kim | B60K 35/00 |

(Continued)

*Primary Examiner* — Afroza Chowdhury
(74) *Attorney, Agent, or Firm* — Wang Law Firm, Inc.

(57) ABSTRACT

A multi-focal plane head-up display includes a main body, a projector, a first reflective element, a second reflective element, a polarizing element and a third reflective element. The polarization direction of a first image light in the first region of the projection image projected by the projector and the polarization direction of a second image light in the second region of the projection image are orthogonal to each other. The first image light passes through the first reflective element and the polarizing element to form a first virtual image. The second image light passes through the second reflective element, the polarizing element and the third reflective element to form a second virtual image. This can not only provide two virtual images with different focal planes, but also reduce the volume occupied by the head-up display and reduce manufacturing costs.

11 Claims, 13 Drawing Sheets

(56) References Cited

U.S. PATENT DOCUMENTS

| | | | |
|---|---|---|---|
| 2017/0052379 A1* | 2/2017 | Yang | G02B 27/0172 |
| 2017/0235138 A1* | 8/2017 | Morohashi | H04N 9/3141 |
| | | | 359/631 |
| 2017/0336628 A1* | 11/2017 | Kim | G02B 5/30 |
| 2018/0120562 A1* | 5/2018 | Yata | G02B 27/283 |
| 2018/0124364 A1* | 5/2018 | Yata | H04N 9/3179 |
| 2018/0129042 A1* | 5/2018 | Yamazoe | G02B 13/16 |
| 2018/0157036 A1* | 6/2018 | Choi | G06T 19/006 |
| 2019/0086662 A1* | 3/2019 | Matsuzaki | G02B 27/0179 |
| 2019/0179143 A1* | 6/2019 | Nambara | G02B 27/01 |
| 2019/0265582 A1* | 8/2019 | Sakai | G02B 27/0101 |
| 2020/0012099 A1* | 1/2020 | Kim | G02B 5/30 |
| 2021/0033863 A1* | 2/2021 | Hong | G02B 27/283 |

* cited by examiner

MULTI-FOCAL PLANE HEAD-UP DISPLAY

BACKGROUND

Field of the Invention

The present invention relates to a display, and more particularly to a multi-focal plane head-up display.

Related Prior Art

Nowadays, in addition to the performance of the vehicle, the driver's requirements for the vehicle have begun to focus on the interior and safety equipment of the vehicle. The assistance of technological products, such as an internal voice navigation system, a voice collision warning system, etc., does reduce the occurrence of accidents caused by drivers' long time fatigued driving, distraction, etc. Moreover, the dashboard that the driver must use is a non-voice device, and it is usually set below the driver's eye level, so the driver often needs to move his sight down to the dashboard to see the information provided on the dashboard. In addition, the display device of the navigation system is usually installed on the side of the dashboard. Therefore, when the driver wants to view the road information on the display device, he has to look away to see it. Under such circumstances, it is easy to affect driving safety.

For this reason, a head-up display that allows users to view the information they need without having to divert their attention. The existing head-up display generally includes two main elements: a projector and a combiner. The projector includes a signal light source, a projection lens and other optical elements. The signal light source of the projector can be provided by a liquid crystal display or a cathode ray tube display, or by a plurality of light-emitting diodes or lasers as well as micro scanning mirrors or digital light processing (DLP) components. The projector projects the light emitted by the signal light source onto the combiner on the glass (or onto a special transparent screen) to make the combiner display text or images.

Please refer to the head-up display shown in FIG. 1, which uses one or more reflectors to perform light path adjustment, image magnification or distortion correction of the light projected by the projector, and finally the light is reflected by the windshield to the driver's eyes, so that the driver can see the virtual image formed by the above-mentioned projected light in front of the windshield. This is a single focal plane head-up display. However, when such a head-up display for navigation is used to guide the driver to switch to the correct lane or to warn the driver for the distance to the front vehicle, the image of the guiding sign formed cannot nestle to the road that the driver sees, so that driver still has to shift his attention from the road to the image projected by the head-up display.

Therefore, another head-up display that can provide dual focus has been developed, as shown in FIG. 2. This head-up display uses multiple reflectors to perform light path adjustment, image magnification, or distortion correction of the light projected by two projectors. Finally, the windshield reflects the light to the driver's eyes so that the driver can see two virtual images of different focal planes located in front of the windshield, and one of the focal plane images displayed distance is lengthened to fit on the road to solve the problem that the driver's focus must be switched between the road and the navigation guidance sign. However, using two projectors not only requires more reflectors in cooperation with them, but also increases manufacturing costs and space occupation.

In FIG. 3 showing another conventional dual-focal plane head-up display using a single projector, the image light projected by the projector is split by a reflective polarizer, and then is reflected by a concave reflector toward the windshield, and the windshield further reflects the image light into the driver's eyes to form a virtual image of two different focal planes in front of the windshield. However, in this light path design, the reflective polarizer is likely to obstruct the light outlet, resulting in an insufficient light outlet. To design a large enough light outlet, it is necessary to increase the size of the entire optical machine.

The present invention has arisen to mitigate and/or obviate the afore-described disadvantages.

SUMMARY

One objective of the present invention is to provide a head-up display that can provide multiple focal plane virtual images.

To achieve the above objective, a multi-focal plane head-up display in accordance with one embodiment of the present invention comprises: a main body including an accommodating space and a light outlet, and the light outlet facing a windshield; a projector disposed in the accommodating space and configured to project light of a projection image, wherein the projection image includes a first region and a second region, the light include a first image light beam corresponding to the first region and a second image light beam corresponding to the second region, polarization directions of the first image light beam and the second image light beam are orthogonal to each other; a first reflective element disposed in the accommodating space; a second reflective element disposed in the accommodating space; a polarizing element disposed in the accommodating space and including a first side and a second side opposite to the first side, wherein both the first reflective element and the second reflective element are arranged at the first side of the polarizing element, the polarizing element allow one of the first image light beam and the second image light beam to pass through, and allow the other of the first image light beam and the second image light beam to be reflected; and a third reflective element disposed in the accommodating space and located at the second side of the polarizing element, wherein the first region, the first reflective element, the polarizing element and the windshield are sequentially arranged along a first optical path, the first image light beam is projected to a user's eyes through the first light path to form a first virtual image, the second region, the second reflective element, the polarizing element, the third reflective element and the windshield are sequentially arranged along a second optical path, and the second image light beam is projected to the user's eyes through the second light path to form a second virtual image.

In another embodiment, an angle between the polarizing element and the third reflective element is greater than 0 degree.

In yet another embodiment, the polarizing element is a polarization beam splitter or a polarization beam splitter film.

In yet another embodiment, the first image light beam and the second image light beam projected by the projector are both linearly polarized light beams, the head-up display further comprises a first phase retardation element in the first region, a phase retarded image light beam is formed after the first image light beam passes through the first phase retardation element, and a polarization direction of the phase retarded image light beam is orthogonal to the polarization direction of the second image light beam.

In yet another embodiment, the first image light beam and the second image light beam projected by the projector are both linearly polarized light beams, the head-up display further comprises a second phase retardation element in the second region, a phase retarded image light beam is formed after the second image light beam passes through the second phase retardation element, and a polarization direction of the phase retarded image light beam is orthogonal to the polarization direction of the first image light beam.

In yet another embodiment, the first image light beam and the second image light beam projected by the projector are both linearly polarized light beams, the head-up display further comprises a first phase retardation element in the first region and a second phase retardation element in the second region, two retarded image light beams are formed after the first image light beam and the second image light beam pass through the first phase retardation element and the second phase retardation element, respectively, and a polarization direction of the phase retarded image light beam formed from the first image light beam and a polarization direction of the phase retarded image light beam formed from the second image light beam are orthogonal to each other.

In yet another embodiment, the first phase retardation element and the second phase retardation element are half wave plates.

In yet another embodiment, the first image light beam and the second image light beam projected by the projector have no specific polarization, the head-up display further includes a first linear polarizer in the first region and a second linear polarizer in the second region, and the first image light beam and the second image light beam respectively pass through the first linear polarizer and the second linear polarizer to form linearly polarized light beams, and polarization directions of the linearly polarized light beams are orthogonal to each other.

In yet another embodiment, at least one of the first reflective element, the second reflective element, the polarizing element and the third reflective element is a curved mirror.

In yet another embodiment, the first image light beam is reflected to the polarizing element by the first reflective element, and is then reflected by the polarizing element to the windshield; and when the second image light beam is reflected to the polarizing element by the second reflective element, the second image light beam passes through the polarizing element and travels to the third reflective element, the second image light beam is reflected by the third reflective element to the polarizing element, and then the second image light beam is projected to the windshield after passing through the polarizing element again.

Accordingly, the multi-focal plane head-up display provided by the present invention can project two image lights with different polarization directions from the first area and the second area of the projector, and can design the optical path of the image light by arranging several reflective elements and a reflective polarizing element, so that the two image light beams can form two virtual images with different focal planes, and the volume occupied by the head-up display can reduce.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
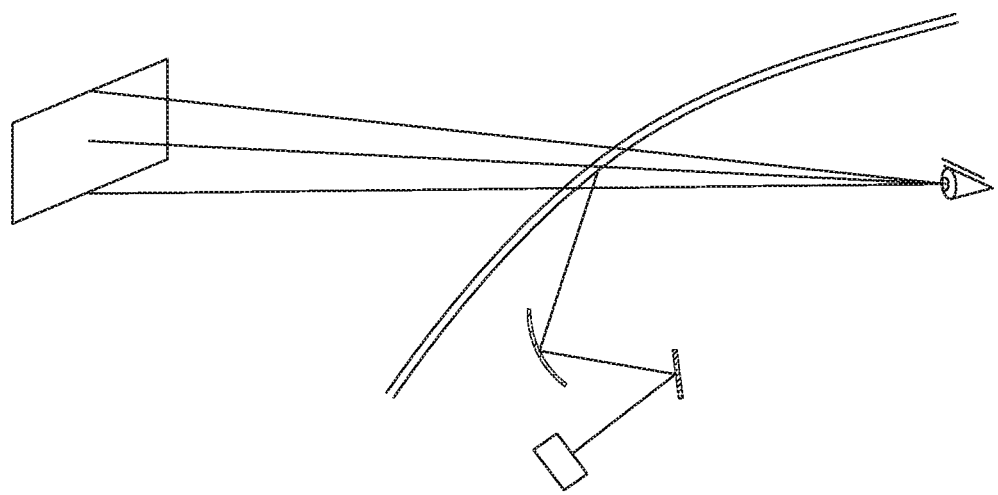
FIG. 1 is a schematic diagram of a conventional single focal plane head-up display.
Figure 2:
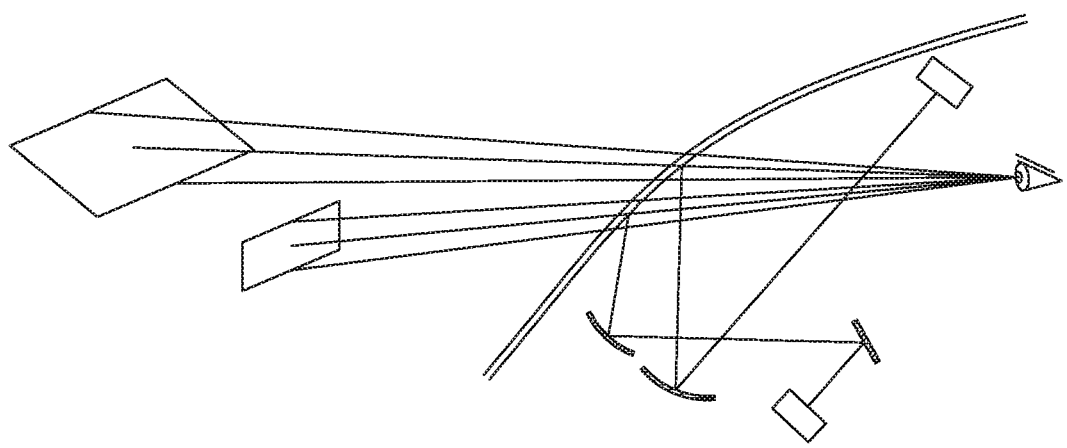
FIG. 2 is a schematic diagram of a dual-focal plane conventional head-up display with two projectors.
Figure 3:
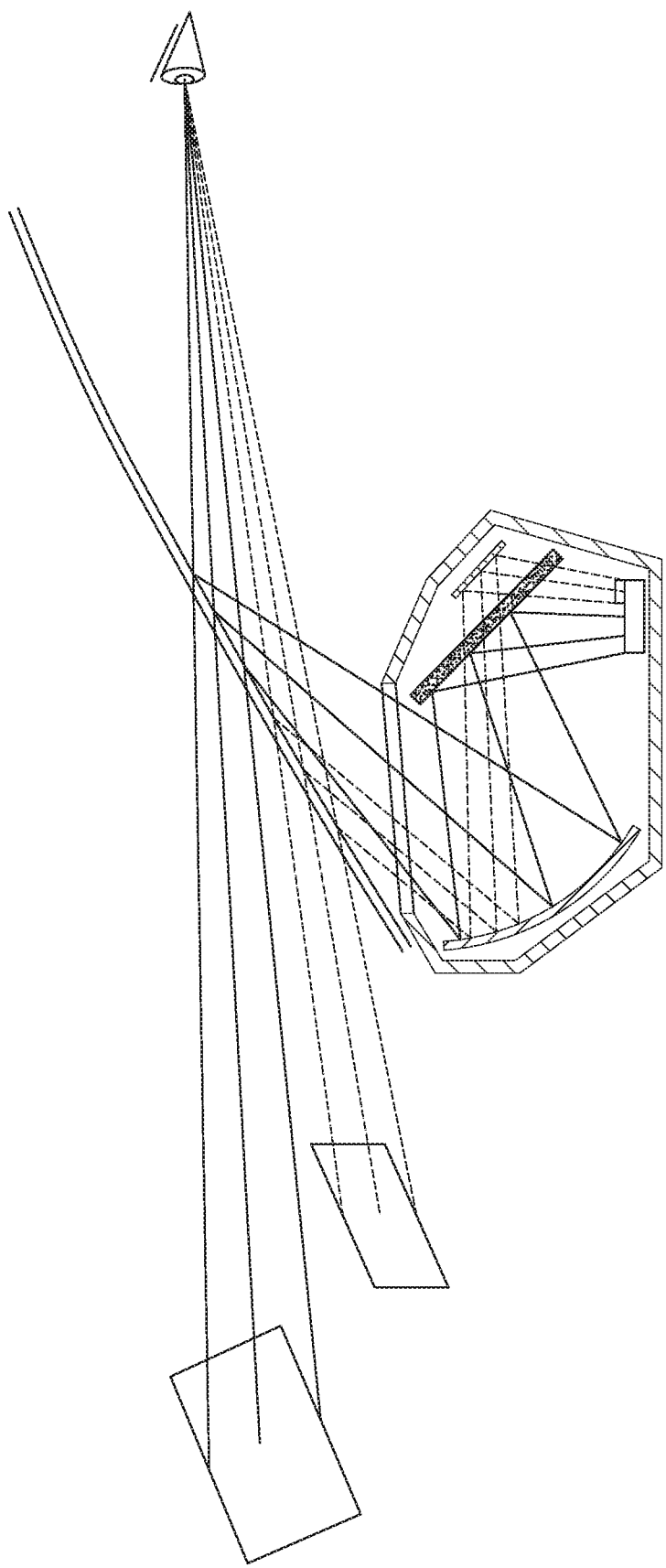
FIG. 3 is a schematic diagram of a conventional dual-focal plane head-up display with a single projector.

The present invention will be clearer from the following description when viewed together with the accompanying drawings, which show, for purpose of illustrations only, the preferred embodiment in accordance with the present invention.

Please refer to FIGS. 4A to 5B, a multi-focal plane head-up display provided by an embodiment of the present invention is suitable for installation on a transportation device, such as a vehicle, an airplane, and the like. Specifically, the head-up display of the present invention can be, for example, but not limited to, mounted to a first side G11 of a windshield G of the transportation device. The first side G11 faces the user, and a second side G12 of the windshield G is opposite to the first side G11 and faces the outside of the transportation device.

The multi-focal plane head-up display may include a main body 1, and the main body 1 includes a housing 11 and a light outlet 12. The main body 1 is arranged on the first side G11 of the windshield G, with the light outlet 12 facing the windshield G. In addition, the main body 1 is provided with an accommodating space 13 to accommodate at least a part of the components of the head-up display, and the at least part of the elements in the head-up display device will be exemplified as follows.

The multi-focal plane head-up display may include a projector 2, a first reflective element 3, a second reflective element 4, a polarizing element 5, and a third reflective element 6 which are disposed in the accommodating space 13 of the main body 1.

The projector 2 includes a first region R1 and a second region R2. In detail, the projector 2 is used to project light containing a projection image, the projection image includes the first region R1 and the second region R2, and the light include a first image light beam L1 corresponding to the first region R1 and a second image light beam L2 corresponding to the second region R2. The polarization directions of the first image light beam L1 and the second image light beam L2 are different. In other words, the projector 2 can, for example, use a signal light source to project light with an image. This image can be divided into two partial images corresponding to the first region R1 and the second region R2, respectively, so that the light projected by the projector 2 can be divided into a first image light beam located in the first region R1 with one partial image and a second image light beam located in the second region R2 with another partial image.

The first reflective element 3 can be, for example, a reflecting mirror for reflecting light. Specifically, the first reflective element 3 can be, for example, a curved mirror.

The second reflective element 4 can be, for example, a reflecting mirror for reflecting light. Specifically, the second reflective element 4 can be, for example, a curved mirror.

The polarizing element 5 includes a first side 51 and a second side 52 opposite to the first side 51. Both the first reflective element 3 and the second reflective element 4 are arranged at the first side 51 of the polarizing element 5. The polarizing element 5 can be, for example, a reflective polarizer for reflecting light conforming to a first polarization direction and allowing light conforming to a second polarization direction different from the first polarization direction to pass through, so that the first image light beam L1 traveling from the first reflective element 3 and conforming to the first polarization direction can be separated from the second image light beam L2 traveling from the second reflective element 4 and conforming to the second polarization direction. More specifically, the polarizing element 5 can be, for example, a polarization beam splitter or a polarization beam splitter film. The polarizing element 5 can be, for example, a curved mirror.

The third reflective element 6 is disposed at the second side 52 of the polarizing element 5. The third reflective element 6 can be, for example, a reflecting mirror for reflecting light. Specifically, the third reflective element 6 can be, for example, a curved mirror.

In this embodiment or other embodiments, the first region R1 of the projector 2, the first reflective element 3, the polarizing element 5 and the windshield G are sequentially arranged along a first optical path which also extends from the windshield G to the user's eyes (that is, the viewpoint E). The first image light beam L1 passes through the first light path and is projected to the viewpoint E to form a first virtual image V1. Specifically, in an embodiment, the first region R1 of the projector 2 projects the first image light beam L1 toward the first reflective element 3, and the first image light beam L1 is reflected by the first reflective element 3 to the polarizing element 5 and is reflected by the polarizing element 5 to the light outlet 12 and projected to the windshield G; and finally, the first image light beam L1 is projected to the viewpoint E. At this time, the user can see the first virtual image V1 brought by the first image light L1, such as the first virtual image V1 serving as a road marking shown in FIG. 5A.

The second region R2 of the projector 2, the second reflective element 4, the polarizing element 5, the third reflective element 6 and the windshield G are sequentially arranged along a second optical path which also extends from the windshield G to the user's eyes (that is, the viewpoint E). The second image light beam L2 passes through the second light path and projected to the viewpoint E to form a second virtual image V2. Specifically, in an embodiment, the second region R2 of the projector 2 projects the second image light beam L2 toward the second reflective element 4, the second image light beam L2 is reflected by the second reflective element 4 to the polarizing element 5, and is projected to the third reflective element 6 after passing through the polarizing element 5, and then reflected by the third reflective element 6 to the polarizing element 5. Then, after passing through the polarizing element 5 again, the second image light beam L2 is projected to the light outlet 12 and travels to the windshield G, and is finally projected to the viewpoint E. At this time, the user can see the second virtual image brought by the second image light beam L2, such as the second virtual image V2 serving as a function prompt shown in FIG. 5A.

In addition, in this embodiment, the polarization directions of the two image light beams projected by the projector 2 are different. For example, the two image light beams projected by the projector 2 using a liquid crystal display as the light source are linearly polarized light beams, and the projector 2 is provided with a first phase retardation element 21, such as a half-wave plate, in the first region R1. In this case, when the angle between the polarization angle of the first image light beam L1 and the optical axis of the half-wave plate is set to about 45 degrees, a phase retarded image light beam whose polarization angle rotated 90 degrees will be formed after the first image light beam L1 passes through the first phase retardation element 21, and the polarization direction of the phase retarded image light bean is substantially orthogonal to the polarization direction of the second image light L2. Likewise, the second phase retardation element 22 can be arranged in the second region R2 of the projector 2 instead, such as the second phase retardation element 22 shown in FIG. 4A. In this case, when the angle between the polarization angle of the second image light beam L2 and the optical axis of the second phase retardation element 22 is set to about 45 degrees, a phase retarded image light beam whose polarization angle rotated 90 degrees will be formed after the second image light beam L2 passes through the second phase retardation element 22, and the polarization direction of the phase retarded image light beam is substantially orthogonal to the polarization direction of the first image light beam L1.

Alternatively, for example, the two image light beams projected by the projector 2 using a liquid crystal display are both linearly polarized light beams, and the projector 2 is provided with the first phase retardation element 21, such as a half-wave plate, in the first region R1, and the second phase retardation element 22, such as a half-wave plate, in the second region R2. The half-wave plate has an optical axis. When an angle between the polarization angle of the input light and the optical axis of the half-wave plate is 0, it will result to an angle between the polarization angle of the output light and the polarization angle of the input light is 20. In the case of the phase retardation elements 21 and 22 shown in FIGS. 7-11, when an angle α between the polarization angle of the first image light beam L1 and the optical axis of the first phase retardation element 21 is set to about 22.5 degrees, and an angle β between the polarization angle of the second image light beam L2 and the optical axis of the second phase retardation element 22 is set to about −22.5 degrees, the polarization angle of the first image light L1 will rotate 45 degrees, and the polarization angel of the second image light L2 will rotate −45 degrees, so the angle between the polarization directions of the first image light and the second image light is 90 degrees. In practice, the angle α and the angle β can be designed to be the same value or different values as desired, as long as they meet the condition: |2α|+|2β|=90.

Figure 6:
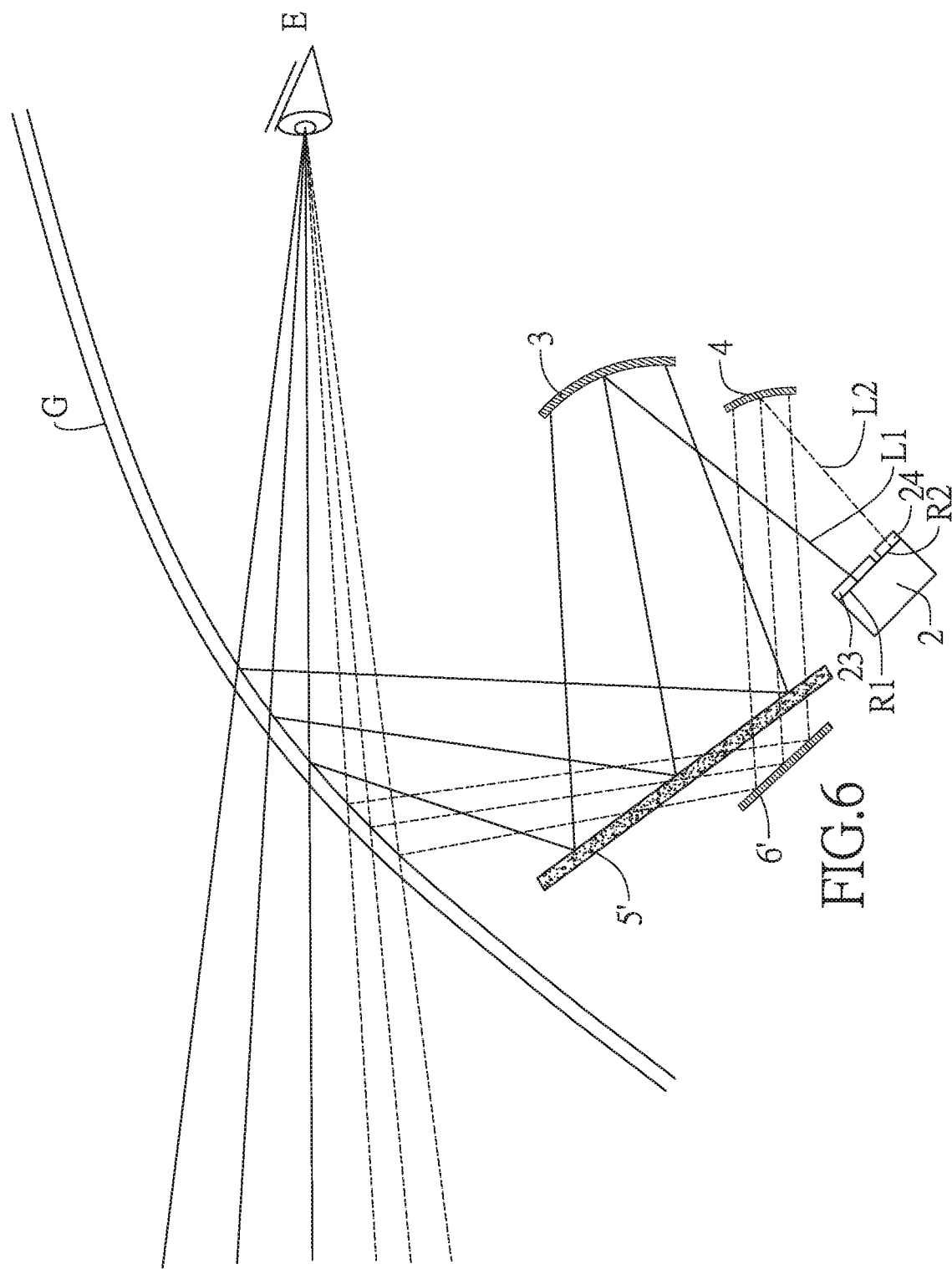
FIG. 6 is a schematic diagram of the head-up display device provided by an embodiment of the present invention.

Alternatively, in an example shown in FIG. 6, the two image light beams projected by the projector 2 using a digital light processing (DLP) are nonlinearly polarized light beams, the projector 2 is provided with a first linear polarizer 23 in the first area R1, and a second linear polarizer 24 in the second region R2. In this case, when the difference between polarization angles of the first linear polarizer 23 and the second linear polarizer 24 is 90 degrees, the polarization direction of the first polarized image light beam formed from the first image light beam L1 passing through the first linear polarizer 23 is substantially orthogonal to the polarization direction of the second polarized image light beam formed from the second image light beam L2 passing through the second linear polarizer 24.

However, the present invention is not limited to the above-mentioned examples of using a phase retardation element and a linear polarizer to make the image light beam(s) projected by the projector 2 obtain a specific polarization, the relative polarization angle and the type, quantity and positions of the phase retardation element and the linear polarizer can be designed and selected according to the actual application.

In this embodiment or other embodiments, in order to let the image light beam projected onto the windshield G be reflected to the viewpoint E, the head-up display may further include a reflective film 7, which is attached to the first side G11 of the windshield G. The reflective film 7 can be, for example, a translucent material, such as a see through mirror (STM) film, so that the reflectivity of the image light can be improved without affecting the user's viewing of the scenery or road conditions at the second side G12 of the windshield G. Moreover, when the two image light beams are reflected to the viewpoint E through the windshield G, the user can see two virtual images of different focal planes presented at the second side G12 of the windshield G.

Figure 4A:
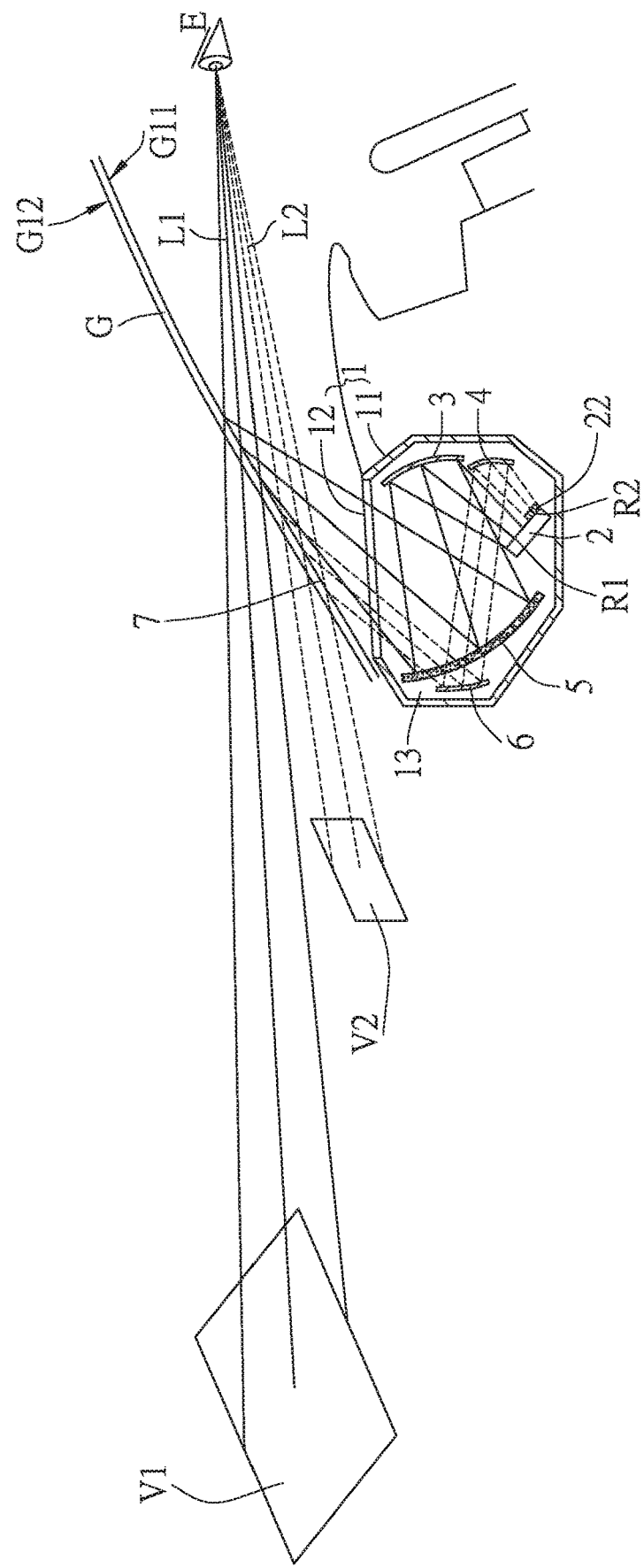
FIG. 4A is a schematic diagram of a head-up display provided by an embodiment of the present invention.
Figure 4B:
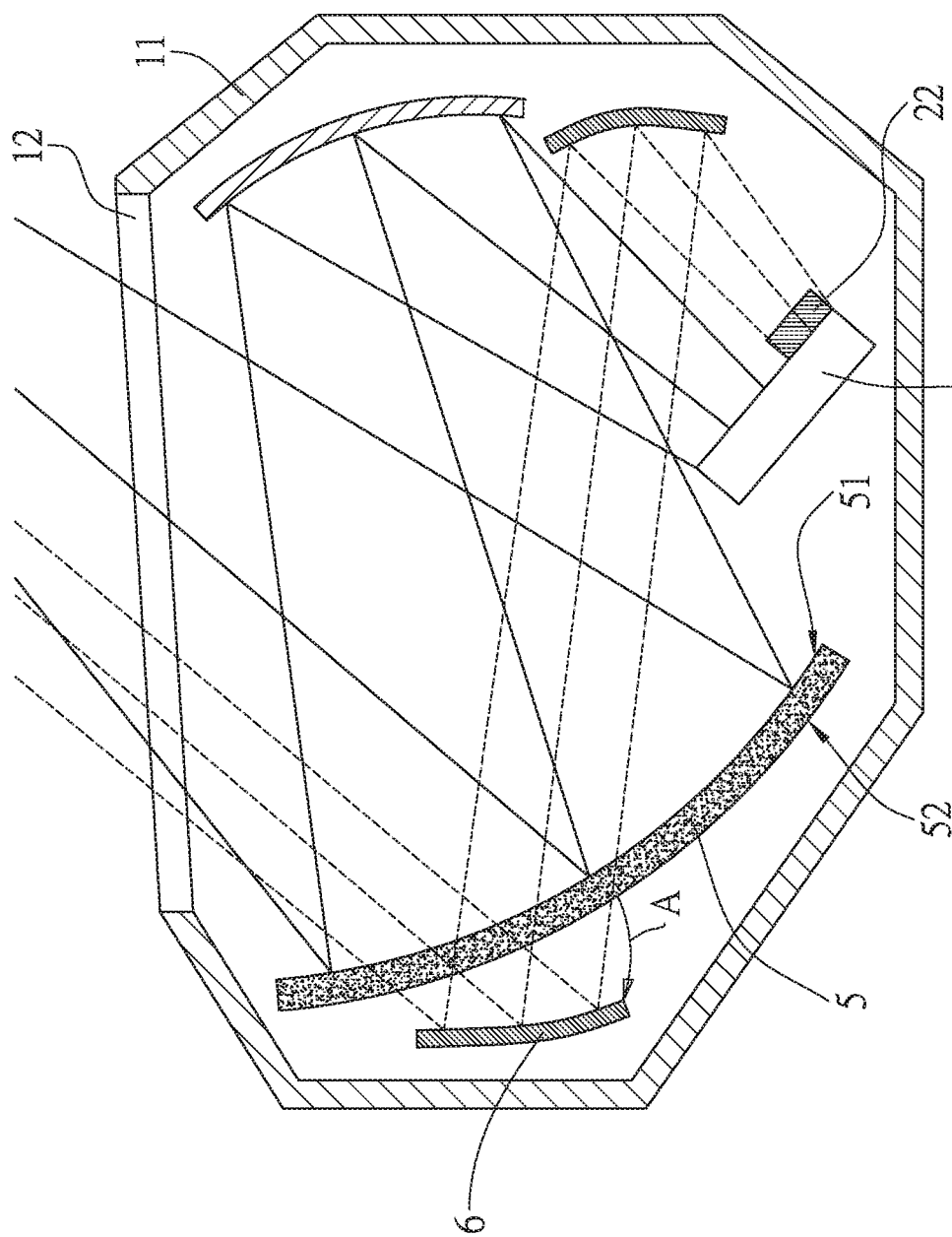
FIG. 4B is a schematic diagram of a part of a head-up display provided by an embodiment of the present invention.

In this embodiment or other embodiments, an angle A between the polarizing element 5 and the third reflective element 6 is greater than 0 degree, as shown in FIG. 4B, so that the utilization of the accommodating space 13 of the main body 1 can be improved, thereby reducing the size of the main body 1. In addition, not only the light outlet 12 is not shielded, but also the size of the light outlet 12 can be further increased to increase the light output of the head-up display.

Figure 7:
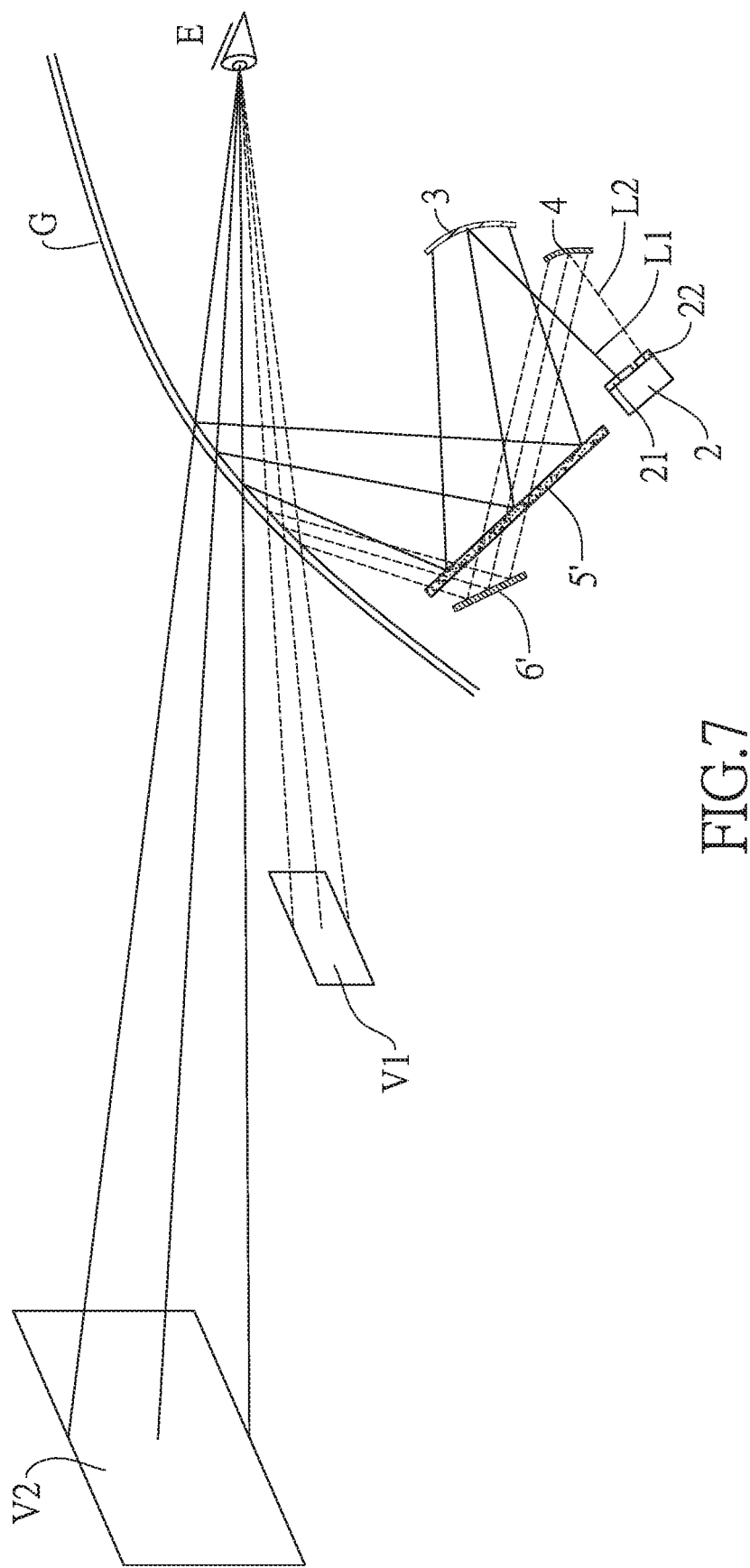
FIG. 7 is a schematic diagram of the head-up display device provided by an embodiment of the present invention.

In this embodiment or other embodiments, the relative position of the polarizing element 5 and the third reflective element 6 can be designed according to actual requirements. For example, as shown in FIGS. 4A and 7, the third reflective element 6 or 6' may be located at a position close to the upper side of the polarizing element 5 or 5' (the upper portion of the polarizing element 5 or 5' in the drawing). Or, for example, as shown in FIG. 6, the third reflective element 6' may be located at a position close to the lower side of the polarizing element 5' (the lower portion of the polarizing element 5' in the drawing). Or, for example, the third reflective element may be located at a position close to the left or right side or the middle of the polarizing element. Therefore, the design of the relative position of the polarizing element and the third reflective element of the present invention can reduce the crosstalk between the optical paths as long as the first optical path and the second optical path described above are staggered for avoiding parallel them as much as possible.

Figure 5A:
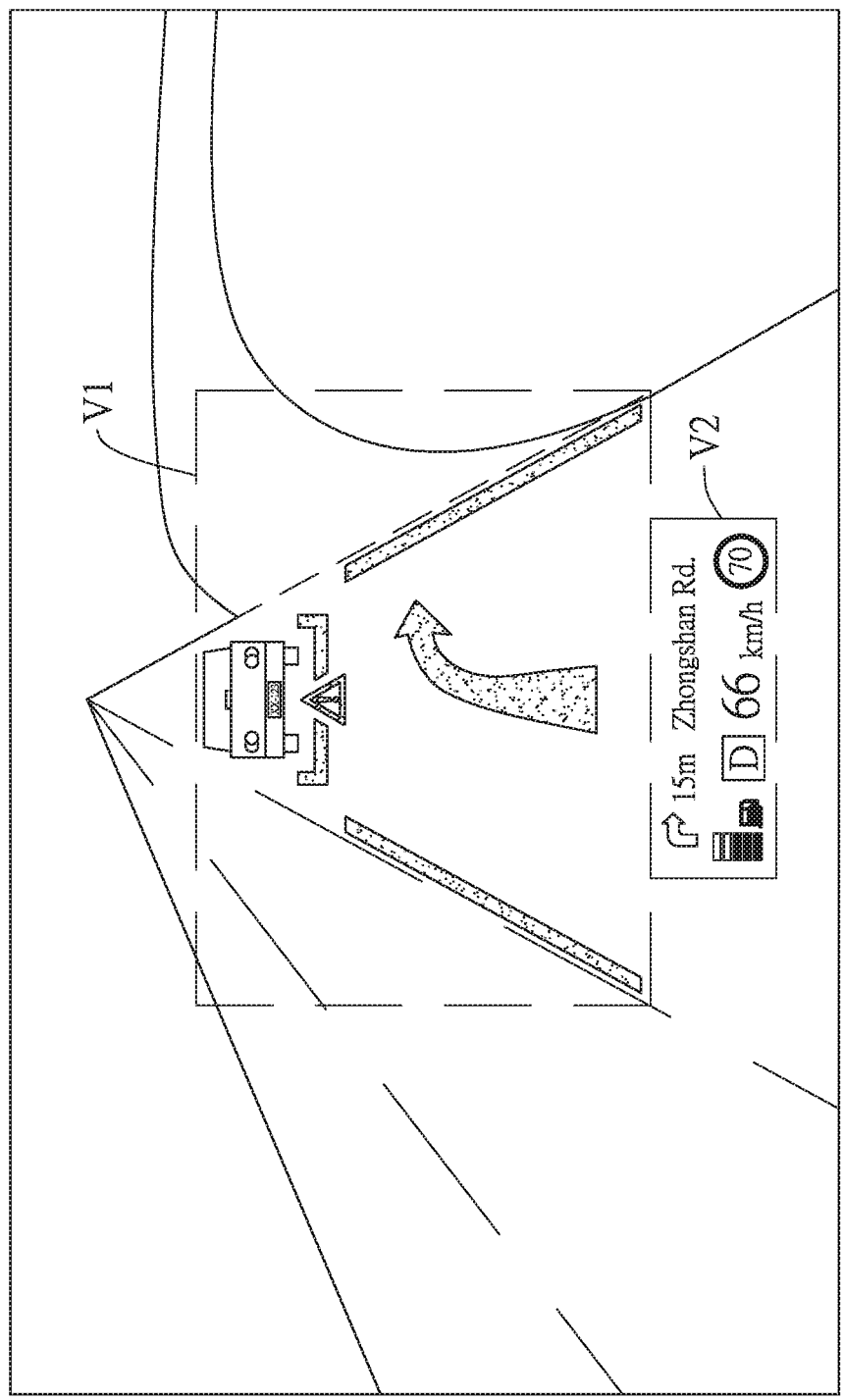
FIG. 5A shows virtual images of two different focal planes formed by a head-up display in accordance with an embodiment of the present invention.
Figure 5B:
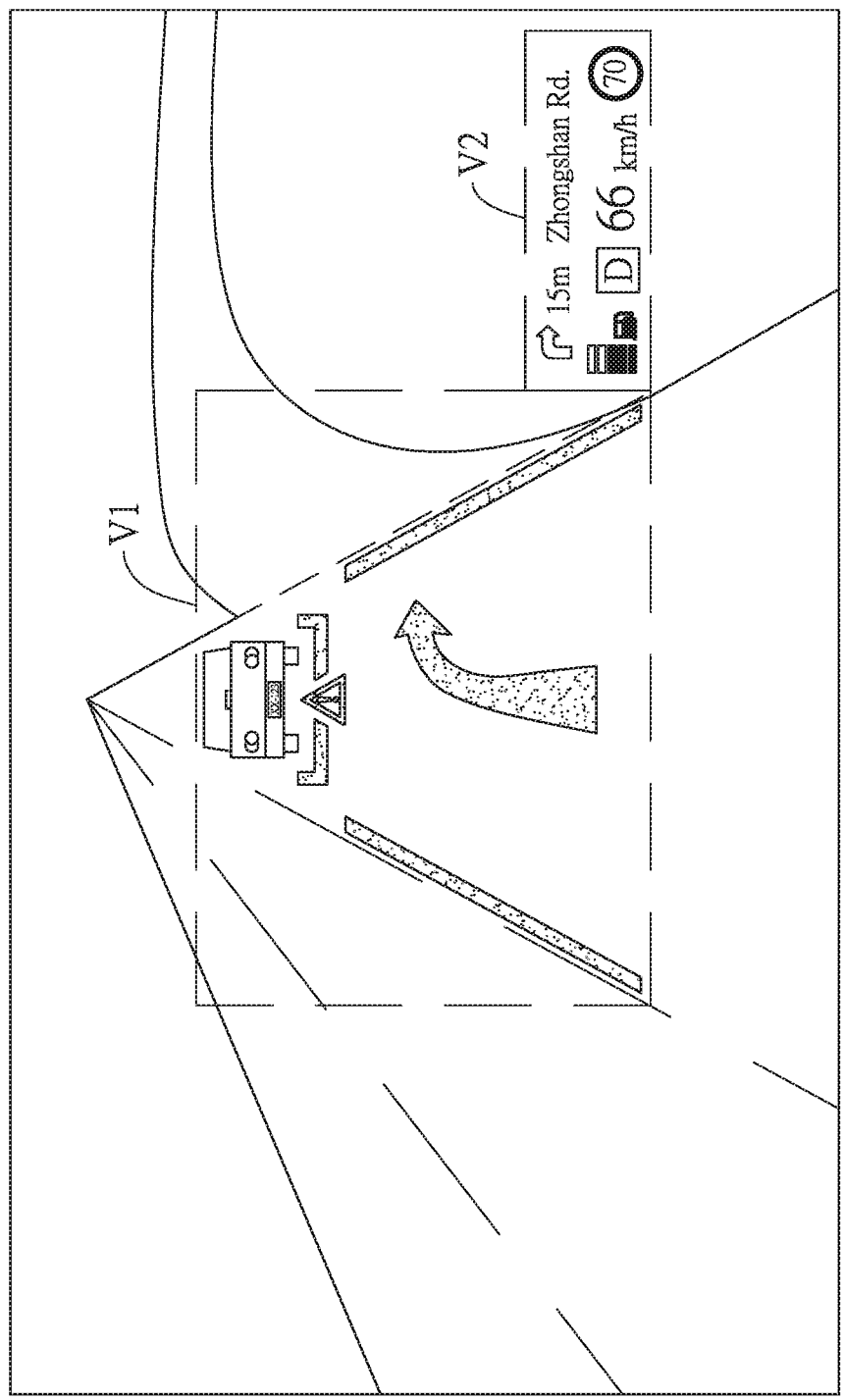
FIG. 5B shows virtual images of two different focal planes formed by the head-up display device in accordance with an embodiment of the present invention.

In this embodiment or other embodiments, the relative position of the first virtual image V1 and the second virtual image V2 can be adjusted according to the design of the position and size of each element in the main body 1. For example, in FIG. 5A, the first virtual image V1 and the second virtual image V2 have an up-and-down or front-and-rear relative positional relationship, e.g. the first virtual image V1 is above the second virtual image V2, or the second virtual image V2 is above the first virtual image V1. Or, as shown in FIG. 5B, the first virtual image V1 and the second virtual image V2 have a left-and-right relative positional relationship, e.g. the first virtual image V1 is at the left of the second virtual image V2, or the second virtual image V2 is at the left of the first virtual image V1.

In this embodiment or other embodiments, the inclination angles of the image planes of the first virtual image V1 and the second virtual image V2 (that is, the angles between the image planes and the horizon) can be designed according to actual application requirements. In this way, graphics or texts, such as markings, indicators, or warnings, displayed in the image can nestle against the actual road or scenery as much as possible, thereby increasing the stereoscopic vision.

Figure 8:
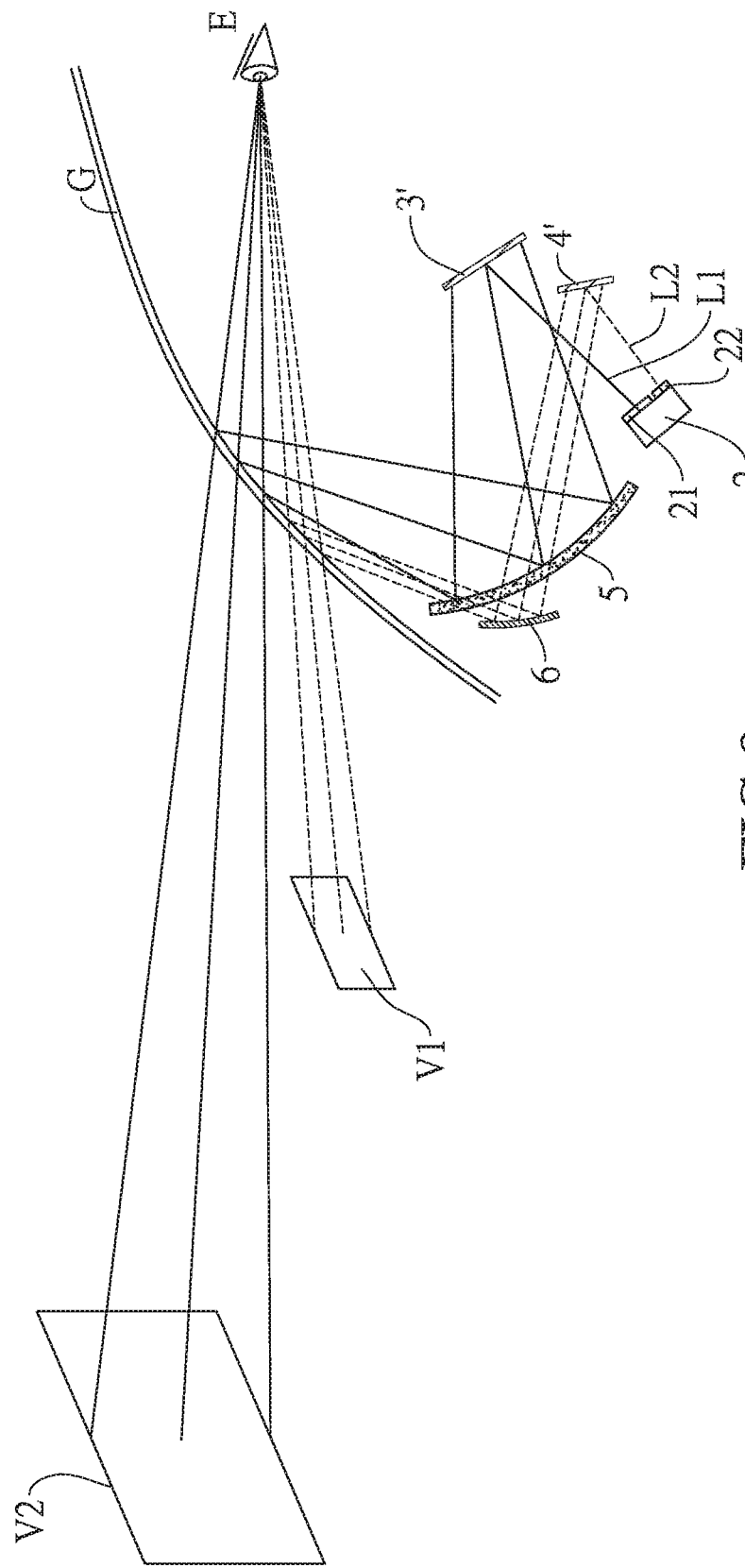
FIG. 8 is a schematic diagram of the head-up display device provided by an embodiment of the present invention.
Figure 9:
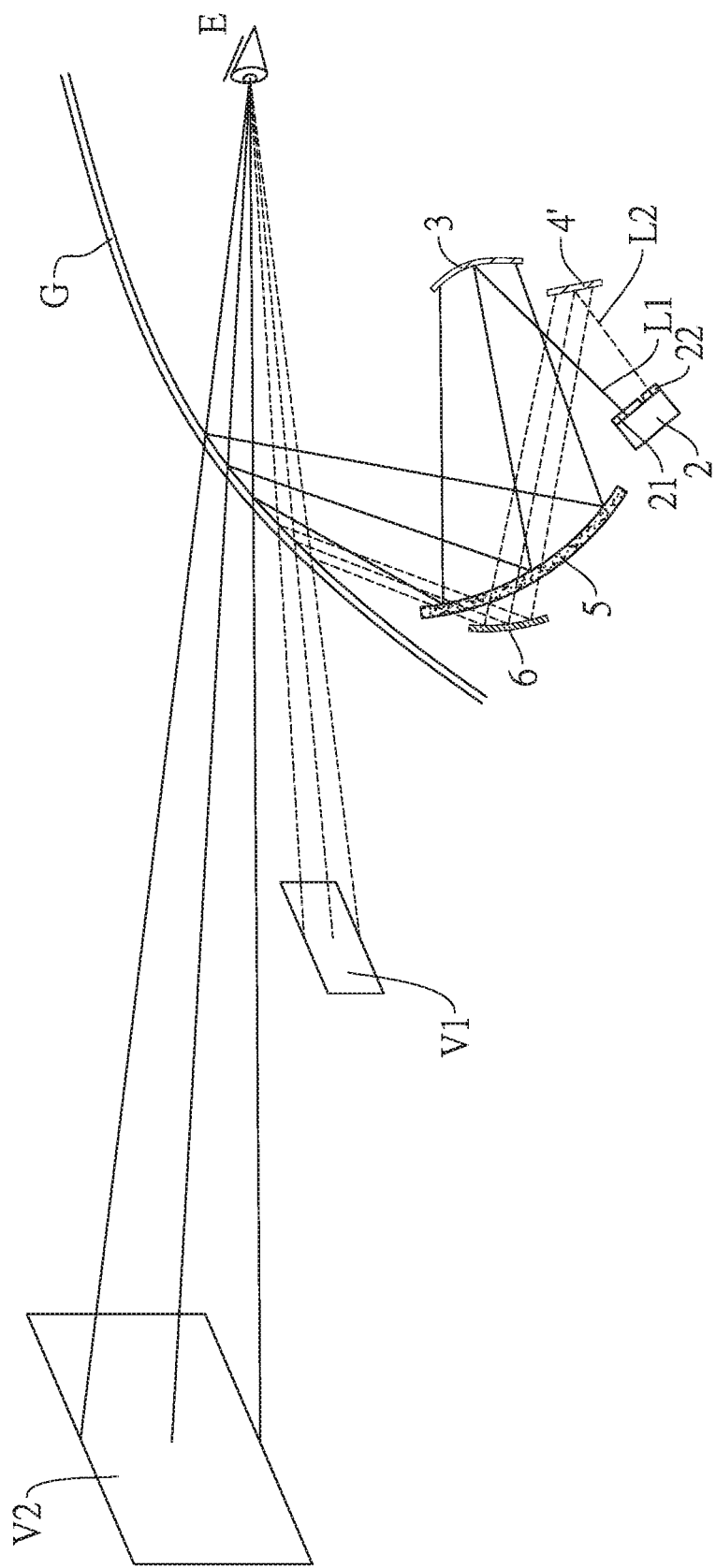
FIG. 9 is a schematic diagram of the head-up display device provided by an embodiment of the present invention.
Figure 10:
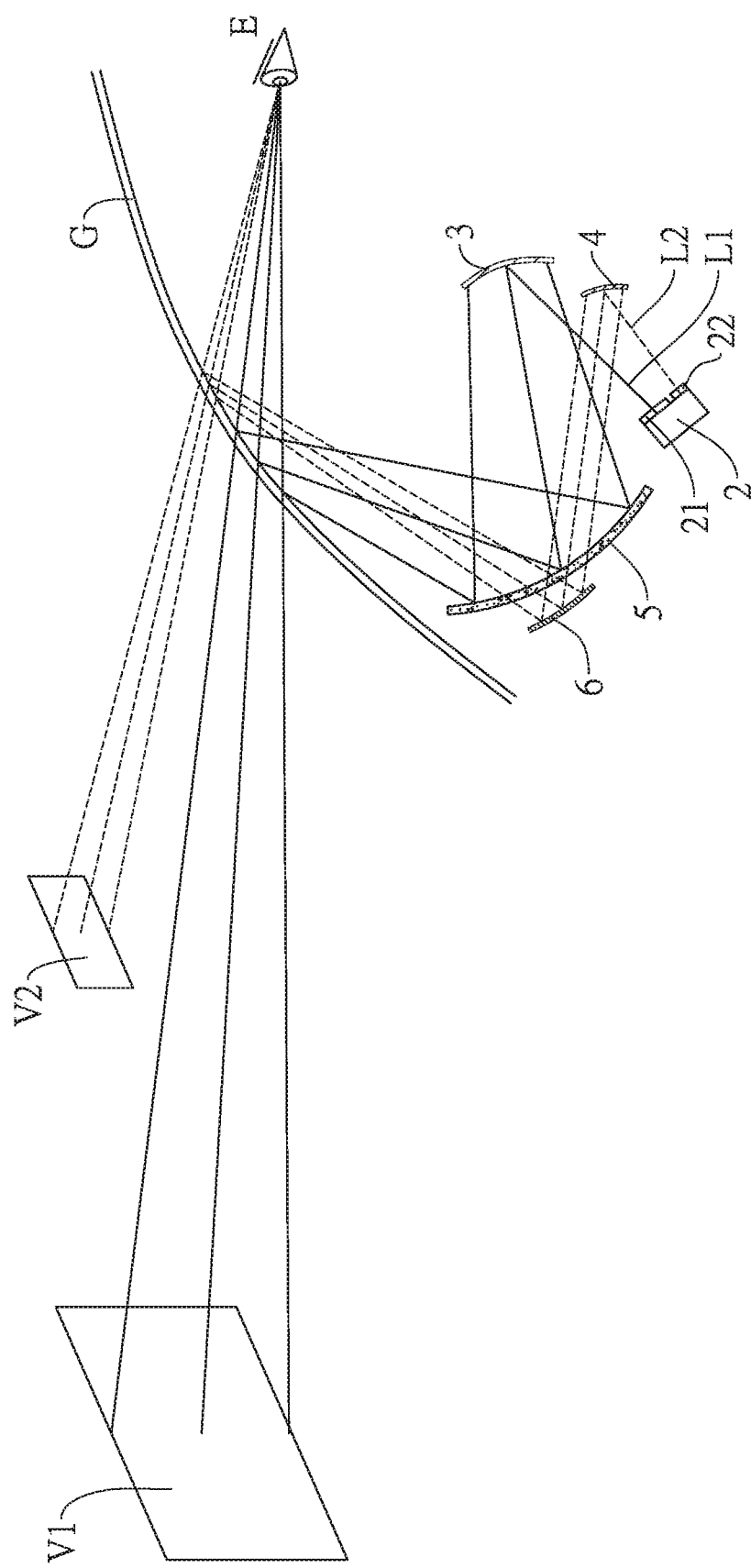
FIG. 10 is a schematic diagram of the head-up display device provided by an embodiment of the present invention.
Figure 11:
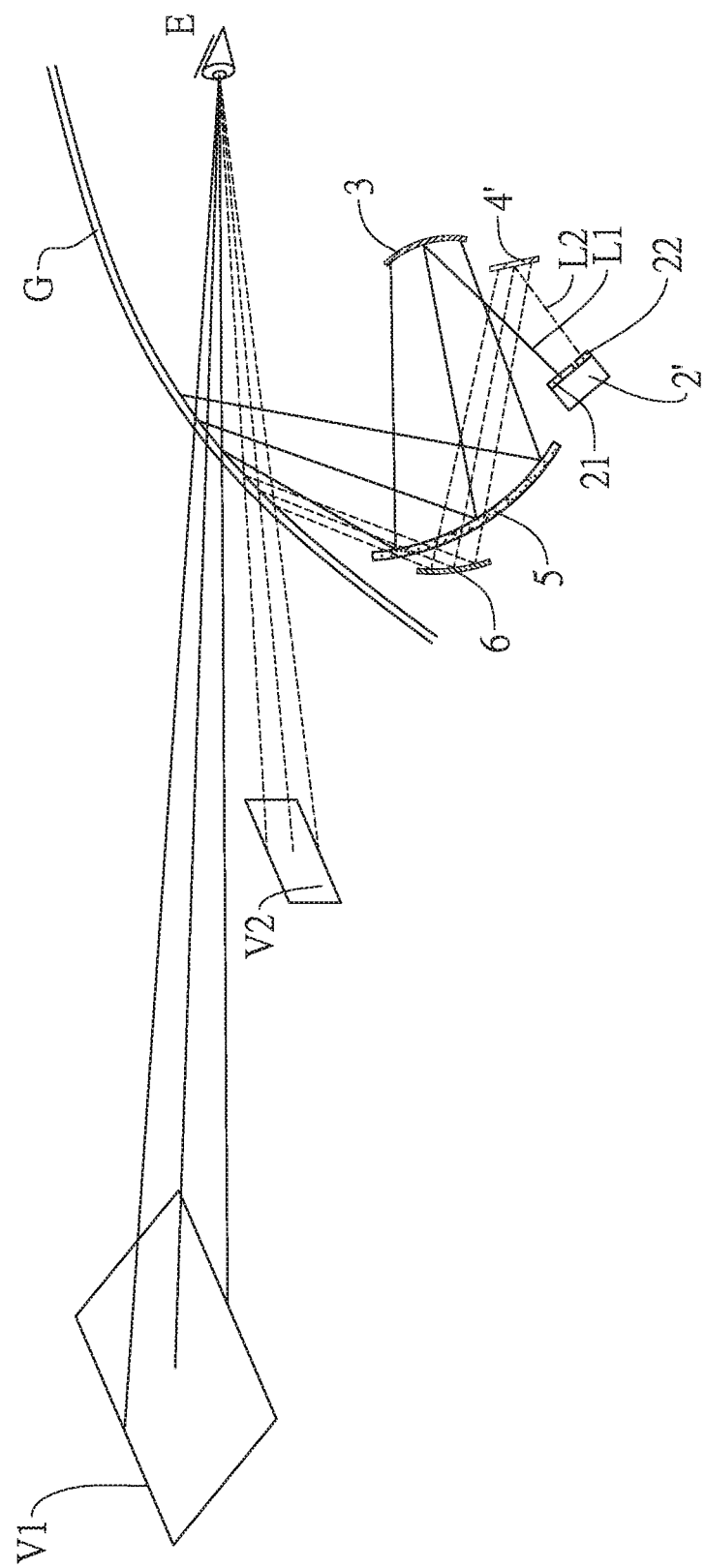
FIG. 11 is a schematic diagram of the head-up display device provided by an embodiment of the present invention.

Although in the above-mentioned embodiments, the first reflective element 3, the second reflective element 4, the polarizing element 5 and the third reflective element 6 are exemplified as curved mirrors, the present invention is not limited to this. In other embodiments, as shown in FIG. 8, the first reflective element 3' may be a flat mirror. In other embodiments, as shown in FIGS. 8, 9, and 11, the second reflective element 4' can also be a flat mirror. In other embodiments, as shown in FIGS. 6 and 7, the polarizing element 5' may be a flat mirror. In other embodiments, as shown in FIGS. 6 and 7, the third reflective element 6 may also be a flat mirror. Therefore, the shapes and types of the first reflective element, the second reflective element, the polarizing element and the third reflective element in the present invention can be designed and collocated according to actual applications.

Figure 12:
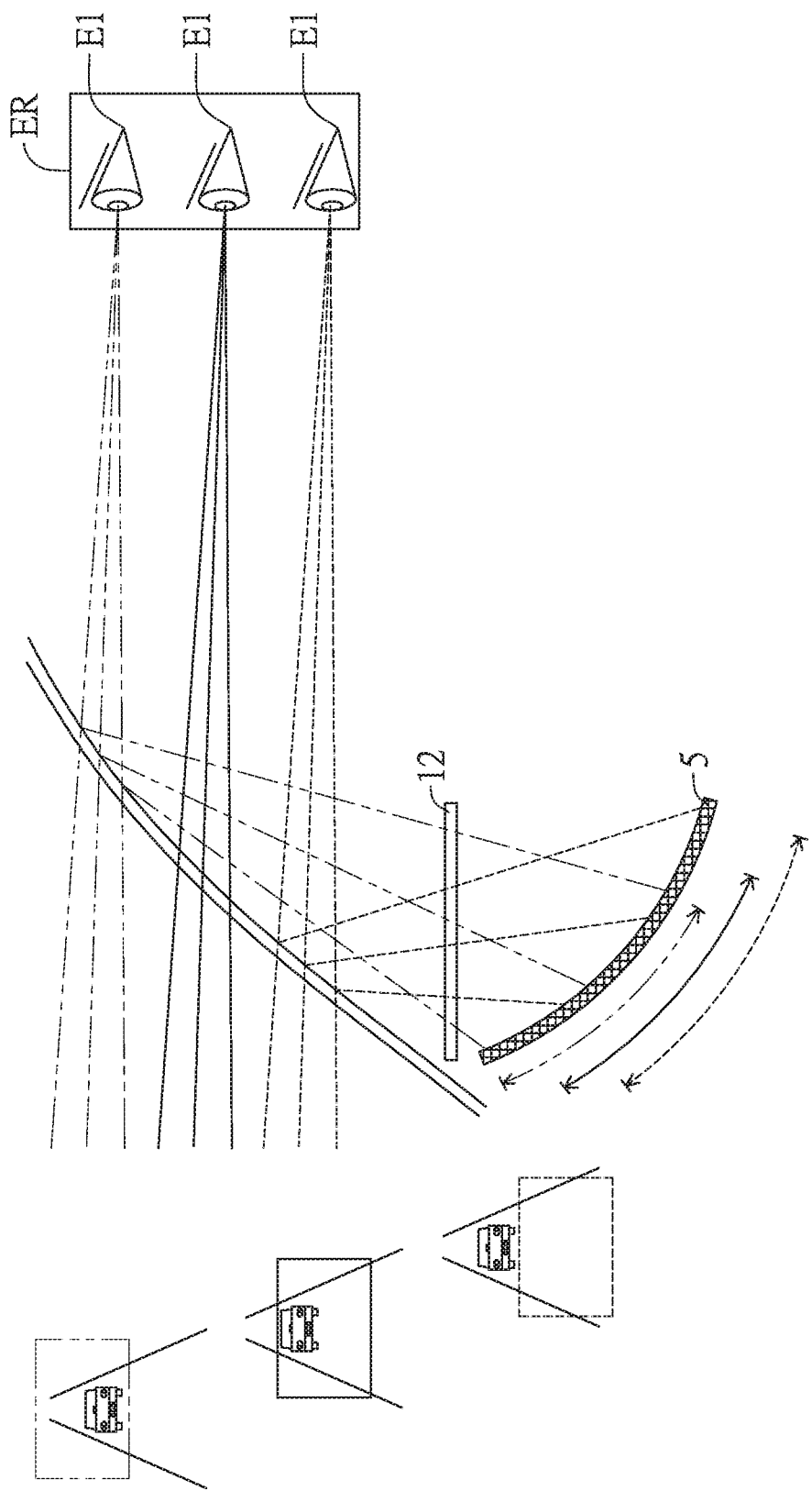
FIG. 12 is a schematic diagram of the head-up display device provided by an embodiment of the present invention, which is used to show that different viewpoint positions in the eye box correspond to different regions of the mirror element.

On the other hand, the height of sight of each user is different, and the head and body do not stay static during driving. Therefore, the size of the eye box ER has to be able to cover such changes. When the eye position changes, the light path will change accordingly, so different regions of the mirror will be used, such as the viewpoints E1, E2 and E3 shown in FIG. 12. The size of the optical mirror will affect the design range of the eye box ER. The head-up display of the present invention has the advantages of space utilization, can use mirror elements of sufficient size as well as a larger light outlet 12, so the range of the eye box may be maximized as possible, and even if the position of the eyes changes, the image can be continuously and completely presented to the user.

In the present invention, the content of the virtual image can be designed by designing the image source of the projector 2 according to actual application requirements. The first virtual image V1 can be used to, for example, but not limited to, to display navigation indicators, driving assistance information, lane lines, or safety warnings. The second virtual image V2 can be used to, for example, but not limited to, display vehicle speed, speed limit, gear, fuel level, road name, etc. Moreover, the present invention does not limit the content presented in the virtual image to be text or graphics.

In summary, the head-up display device provided by the present invention can project two image lights with different polarization directions from the first area and the second area of the projector, and can design the optical path of the image light by arranging several reflective elements and a reflective polarizing element, so that the two image light beams can form two virtual images with different focal planes. Therefore, the volume occupied by the head-up display and the manufacturing cost may be reduced. In addition, the light is split by the reflective polarizing element on tail section of light path to the windshield, and optimizing the relative position of the third reflective element and the reflective polarizing element, so that the head-up display may occupy a smaller volume, the light outlet is not blocked anywhere, and the size of the light outlet and the visual area of the eye box may increase.

While we have shown and described various embodiments in accordance with the present invention, it is clear to those skilled in the art that further embodiments may be made without departing from the scope of the present invention.

What is claimed is:

1. A multi-focal plane head-up display comprising:
a main body including an accommodating space and a light outlet, and the light outlet facing a windshield;
a projector disposed in the accommodating space and configured to project light of a projection image, wherein the projection image includes a first region and a second region, the light includes a first image light beam corresponding to the first region and a second image light beam corresponding to the second region, polarization directions of the first image light beam and the second image light beam are orthogonal to each other;
a first reflective element disposed in the accommodating space;
a second reflective element disposed in the accommodating space;
a polarizing element disposed in the accommodating space and including a first side and a second side opposite to the first side, wherein both the first reflective element and the second reflective element are arranged at the first side of the polarizing element, the polarizing element allow one of the first image light beam and the second image light beam to pass through, and allow the other of the first image light beam and the second image light beam to be reflected; and
a third reflective element disposed in the accommodating space and located at the second side of the polarizing element, wherein the first region, the first reflective element, the polarizing element and the windshield are sequentially arranged along a first optical path, the first image light beam is projected to a user's eyes through the first light path to form a first virtual image, the second region, the second reflective element, the polarizing element, the third reflective element and the windshield are sequentially arranged along a second optical path, and the second image light beam is projected to the user's eyes through the second light path to form a second virtual image;
in the first optical path, the first image light beam is reflected to the polarizing element by the first reflective element, and is then reflected by the polarizing element to the windshield; and
in the second optical path, the second image light beam passes through the polarizing element and is then reflected back to the polarizing element by the third reflective element after reflected to the polarizing element by the second reflective element, and then, the second image light beam is projected from the polarizing element to the windshield when passing through the polarizing element again.

2. The multi-focal plane head-up display as claimed in claim 1, wherein an angle between the polarizing element and the third reflective element is greater than 0 degree.

3. The multi-focal plane head-up display as claimed in claim 1, wherein the polarizing element is a polarization beam splitter or a polarization beam splitter film.

4. The multi-focal plane head-up display as claimed in claim 1, wherein the first image light beam and the second image light beam projected by the projector are both linearly polarized light beams, the head-up display further comprises a first phase retardation element in the first region, a phase retarded image light beam is formed after the first image light beam passes through the first phase retardation element, and a polarization direction of the phase retarded image light beam is orthogonal to the polarization direction of the second image light beam.

5. The multi-focal plane head-up display as claimed in claim 1, wherein the first image light beam and the second image light beam projected by the projector are both linearly polarized light beams, the head-up display further comprises a second phase retardation element in the second region, a phase retarded image light beam is formed after the second image light beam passes through the second phase retardation element, and a polarization direction of the phase retarded image light beam is orthogonal to the polarization direction of the first image light beam.

6. The multi-focal plane head-up display as claimed in claim 1, wherein the first image light beam and the second image light beam projected by the projector are both linearly polarized light beams, the head-up display further comprises a first phase retardation element in the first region and a second phase retardation element in the second region, two phase retarded image light beams are formed after the first image light beam and the second image light beam pass through the first phase retardation element and the second phase retardation element, respectively, and a polarization direction of the phase retarded image light beam formed from the first image light beam and a polarization direction of the phase retarded image light beam formed from the second image light beam are orthogonal to each other.

7. The multi-focal plane head-up display as claimed in claim 4, wherein the first phase retardation element is a half wave plate.

8. The multi-focal plane head-up display as claimed in claim 5, wherein the second phase retardation element is a half wave plate.

9. The multi-focal plane head-up display as claimed in claim 6, wherein the first phase retardation element and the second phase retardation element are half wave plates.

10. The multi-focal plane head-up display as claimed in claim 1, wherein the first image light beam and the second image light beam projected by the projector have no specific polarization, the head-up display further includes a first linear polarizer in the first region and a second linear polarizer in the second region, and the first image light beam and the second image light beam respectively pass through the first linear polarizer and the second linear polarizer to form linearly polarized light beams, and polarization directions of the linearly polarized light beams are orthogonal to each other.

11. The multi-focal plane head-up display as claimed in claim 1, wherein at least one of the first reflective element, the second reflective element, the polarizing element and the third reflective element is a curved mirror.

* * * * *